United States Patent Office 3,467,554
Patented Sept. 16, 1969

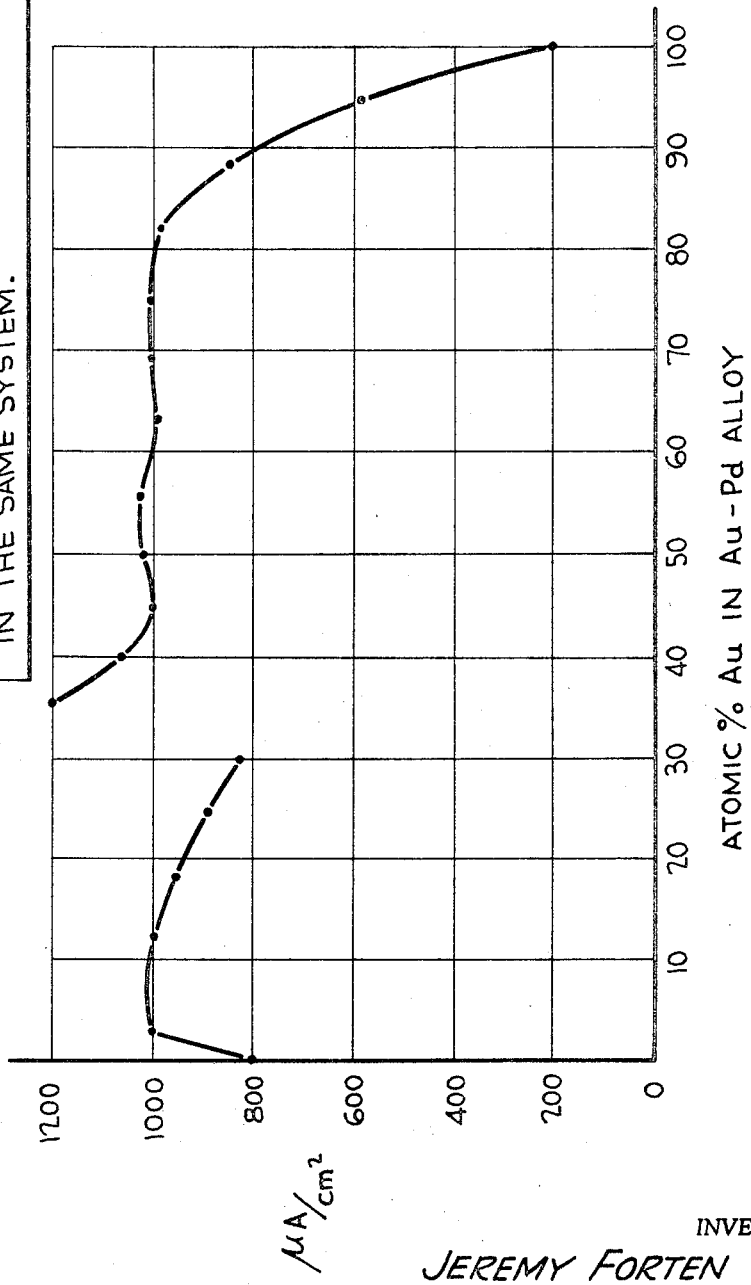

3,467,554
ELECTROCHEMICAL CELL INCLUDING PALLADIUM-GOLD ALLOY BLACK CATALYST
Jeremy Forten, New York, and Edwin Francis Rissman, Brooklyn, N.Y., assignors to Leesona Corporation, Warwick, R.I., a corporation of Massachusetts
Continuation of application Ser. No. 374,396, June 11, 1964. This application Sept. 25, 1967, Ser. No. 670,464
Int. Cl. H01m 27/10
U.S. Cl. 136—86                                   2 Claims

ABSTRACT OF THE DISCLOSURE

An electrochemical cell utilizing an electrode which contains a palladium-gold alloy having from 35 to 82 atomic percent gold with the remainder being palladium as the catalytic material is described. The alloy in black form is admixed with hydrophobic polymer particles to provide improved results.

---

This application is a continuation of application Ser. No. 374,396, now abandoned.

This invention relates to improved fuel cell electrodes and more particularly to electrodes composed of palladium alloys containing from about 1 to 88% gold. Electrodes of the above-defined composition have been found to possess outstanding electrochemical properties.

A fuel cell, as the term is employed herein, is a device for the direct conversion of the energy of reaction of a fuel and oxidant into low voltage, electrical current. In obtaining an efficient fuel cell, the amount of energy degraded into waste heat must be as small as possible; but, on the other hand, the reaction rate of the cell must be sufficiently high to economically produce the needed current from a cell of practical size.

In their most simplified design, a typical cell comprises a housing, an oxidant electrode, a fuel electrode, an electrolyte positioned between the electrodes, and means for the introduction of a fuel and an oxidant to their respective electrodes. In operation, the fuel and oxidant are maintained in contact with the electrodes. A process of adsorption, electron transfer, and desorption occurs at the electrode-electrolyte interface involving the reactants and leaving the electrodes electrically charged. Depending upon the nature of the electrolyte, ions are transferred through the electrolyte from the anode to the cathode or from the cathode to the anode. Electrical current is withdrawn from the cell and passed through a suitable load where work is accomplished.

Fuel cells are particularly attractive commercially due to their potentially high performance characteristics. Thus, since fuel cells are not governed by Carnot Cycle limitations, the theoretical efficiency is unlimited. Cells have been constructed having an efficiency of up to about 90%.

However, in spite of the potentially high efficiency of a fuel cell, a completely practical cell from the commercial standpoint has not been devised. The basic criticism of most cells is that the electrodes of the cells are too expensive, particularly due to their relatively short life at high activation with costly materials. Therefore, in an effort to obtain a fuel cell which is practical, from the commercial standpoint, a great deal of research has been carried out in an effort to find electrodes which can be constructed from relatively inexpensive raw materials, or electrodes which, though possessing high activation, have a long life. Thus, even though the latter-type cells may be relatively expensive initially, their long life will make them suitable for practical application.

In the prior art, fuel cell electrodes have been constructed of nickel and other electrodes have been suggested incorporating at least minor amounts of palladium, platinum, and ruthenium as an activator. In general, it can be said that the metals of Group VIII of the Mendelyeev's Periodic Table are known to be desirable from the standpoint of high activity. Thus, electrodes constructed from palladium are greatly superior to electrodes fabricated from gold. It has now been found, quite surprisingly, that the electrochemical properties of palladium can be greatly improved by incorporating substantially any amount of gold. In addition to having improved activation, such electrodes are substantially unaffected by the corrosive influences of a fuel cell electrolyte.

Accordingly, it is an object of the present invention to provide fuel cell electrodes having enhanced electrochemical activation.

It is another object of the invention to provide an improved electrode composed of a palladium alloy containing from about 1 to 88% gold.

It is another object of the present invention to provide a fuel cell comprising an anode, cathode, and an alkaline electrolyte wherein the cathode is composed of a palladium alloy containing from about 1 to 88% gold.

These and other objects of the invention will become more fully apparent from the following detailed description with particular emphasis being placed on the working embodiments.

According to the present invention, a fuel cell electrode is constructed from a palladium alloy containing from about 1 to 88% gold. The electrochemical performance characteristics of the electrodes, even those having high percentages of gold, are surprisingly superior in comparison to fuel cell electrodes composed of pure palladium and pure gold. Although the electrodes are intended primarily for use as oxygen cathodes in an alkaline electrolyte medium where their performance is exceptionally high, it is possible to use the presently described electrodes in an acid medium as the cathode or in a fuel cell as the anode with the cell being operated on conventional fuels such as hydrogen or the carbonaceous fuels.

While the theoretical basis for the superiority of the presently described palladium-gold alloy electrodes is not completely understood, it is theorized that the phenomenon is the result of the filling of the atomic d-vacancies in palladium by alloying with gold. It is considered that the activities of electrodes with atomic d-vacancies are determined by the relative magnitude of two competing effects, (1) the surface coverage with adsorbed reactant, and (2) the adsorptive bond strength, which are both decreased by a decrease in the number of d-vacancies. Electrode activity is increased by an increase in surface coverage with reactant and by a decrease in adsorptive bond strength. It is believed that in the presently described palladium-gold alloys, the filling of the d-vacancies results in the second effect outweighing the first effect which accounts for the surprising superiority of these alloys. However, the explanation is theoretical only and is not to be limiting or controlling.

The electrodes of the present invention can be substantially non-porous structures wherein the reactant gases are caused to flow against and around the electrode, or the structures can be made porous with the reactant gases passing through the electrode. The porous electrodes are either homo-porous or bi-porous, depending largely upon the ultimate use. The bi-porous electrodes are substantially more efficient in that the reaction interface of reactant gases, electrolyte, and solid electrode is more easily controlled. Moreover, the present invention embraces electrodes wherein the palladium-gold alloy is merely used to activate the surface area of less reactive materials such as nickel or carbon, for example, by applying a coating of the alloy black. It is only necessary that the catalytic surface of the electrode be in direct contact with the electrolyte of the cell over the entire reactive area of the electrode.

Although the presently described electrodes can be fabricated containing from 1 to about 88% gold, with the remainder being palladium, superior results are obtained when the electrodes contain from about 35 to 88 atomic percent gold. When the concentration of gold in the palladium alloy is outside the designated range, the improvement in the electrochemical performance characteristics falls off significantly. This is apparent from the drawing which is a plot of current densities supported by foil electrodes submerged in agitated, oxygen saturated electrolyte at 0.850 volt versus a hydrogen electrode in the same system, for pure palladium and pure gold and various percentages of gold in the alloy. Thus, from the graph, it is seen that an electrode composed of 100% gold has a current density of only about 200μ a./cm.$^2$. On the other hand, pure palladium has a current density of approximately 800μ a./cm.$^2$. Only minor amounts of gold increases the electrochemical performance characteristics of the electrodes. However, the greatest improvement is in the area where gold is present in an amount of from 35 to 82 atomic percent of the total composition. Although in the areas directly below 35 percent the electrodes appear to have a high electrochemical performance, it has been found that the materials are somewhat less stable when employed as an oxygen cathode. Therefore, these compositions are not preferred.

The electrodes described herein can be produced by methods known in the art. Thus, non-porous electrodes, for use in fuel cells where the reactant gas is merely caused to flow into and around the electrode, can be made by arc-melting metal powders of palladium and gold in the desired proportions. The resultant structure is a smooth homogeneous mass from which an electrode can be cut to the desired shape. Alternatively, porous electrodes are prepared from powders derived from previously manufactured alloys, having a particle size of from about 1 to 100 microns, compacting and sintering to form a porous structure. More specifically, a porous electrode can be constructed by placing a ring with a lip of the proper thickness, usually from about 0.003" to about 0.30", over an aluminum-coated disc and striking off the excess powder so that a layer of powder, approximately the thickness of the lip, remains. The powders are then compacted and sintered. In the compaction operation, the pressure at which the alloy powders are pressed can vary over relatively wide ranges. Thus, the compaction can be carried out at pressures as low as about 500 p.s.i. and as high as 800 p.s.i. The sintering of the electrodes after compaction can be carried out in any of the usual sintering furnaces. As apparent, the procedure can be modified to prepare bi-porous electrode structures.

In addition to the above methods, it has been found desirable to employ the palladium-gold alloys as a very finely divided alloy black. The metal black can be applied to a suitable support, such as a metal screen, or used to impregnate a pre-formed porous structure. In the former case, the black can be applied to the support as a paste formed by mixing the black with a binder. It can be desirable to admix the alloy black powders with a suitable material such as polytetrafluoroethylene in order to obtain desirable wetting characteristics of the electrode with the electrolyte.

One method of preparing the alloy black for use on an electrode of the aforesaid type is to form an alloy by known metallurgical means, such as melting powders of the different metals together in the proper proportion, preferably above the melting point of the palladium and gold, and thereafter cooling. The alloy so formed is placed in a molybdenum crucible and contacted with metallic lithium, the operation being carried out in an inert argon atmosphere. The system is heated to about 300° C. but not above 500° C. Above 500° C., compound formation will take place, preventing the complete removal of the lithium. The heating is carried out for a duration of from 15 to 20 minutes depending upon the character of the alloy, i.e., whether it is in sheet, button, or wire form. After cooling the lithium-alloy system to room temperature, the entire crucible and contents is placed in an ice bath in order that the ice water enters the crucible. Reaction takes place between the water and lithium whereby lithium is hydrolized, disrupting the alloy and yielding a dispersion of finely divided gold-palladium alloy particles. The particles are filtered and washed several times and dried.

In making the electrode, the finely divided alloy particles are weighed out and added to a suspension of Teflon, a trademark of the Dupont Corporation for polytetrafluoroethylene, particles. Preferably, the weight ratio is about 10 parts metal alloy and 3 parts Teflon solids. The Teflon particles are in the order of 0.05 to 0.5 micron in diameter. A paste is formed from the mixture and applied to a metal support, such as a screen. The entire structure is heated in the neighborhood of 300° C. to stabilize the system. The metal black-Teflon paste adheres very well to the screen and thus is eminently suitable as an electrode.

A second method of preparing the alloy black for use on an electrode is to form the alloy into wires or narrow strips by usual methods known in the art, such as drawing, etc. The alloy wires or strips are mounted in ice water as electrodes, i.e., anode and cathode. A direct current potential of between 150 and 200 volts is applied to the system and the wires brought into close proximity to establish an arc. The arcing erodes the metal and forms a fine suspension of alloy particles in ice water. The metal particles are filtered out and applied to a suitable support as described hereinbefore.

Still a third method of forming electrodes employing finely divided gold-palladium alloy particles is to form a solution of a palladium salt, such as palladium choride, and thereafter add a gold salt, such as gold chloride, in suitable proportions to provide the desired metal to metal ratio. The aforesaid admixture is slowly introduced into a dilute ammonical solution with constant stirring. Upon contact of the two solutions, a finely divided precipitate is formed. A sufficient amount of a reducing agent, such as a dilute solution of hydrazine or bubbling hydrogen, is added to reduce the precipitated material to the finely divided metallic state. Thereafter, the finely divided alloy particles are applied to a suitable support screen as described hereinbefore.

The electrodes of the instant invention are usually employed in cells operating at temperatures of from about 20 to 250° C. However, the temperature to a large extent depends upon the fuel employed in the fuel cell as well as upon the nature of the electrolyte. The limiting temperature of the system, in an acid electrolyte, is the boiling point of the electrolyte. However, temperatures in the range of from about 20 to 175° C. are preferred. With an alkaline electrolyte, substantially higher temperatures can be employed. It has been found that fuel cell systems employing the palladium-gold electrodes of the present invention can be operated within the temperature range of from about 20 to 750° C. with satisfactory performance.

The electrodes, since they are substantially inert to chemical reaction, can be employed in fuel cells using known electrolytes. Alkaline electrolytes which can be employed are the aqueous alkaline materials, such as potassium hydroxide, sodium hydroxide, and potassium carbonate. Acid electrolytes which can be employed include sulphuric and phosphoric acid. Thus, substantially any electrolyte can be used, provided it is capable of transfering ions and remains substantially invariant in the operating environment of the fuel cell. Additionally, the presently described electrodes can be used in conjunction with known prior art anodes and cathodes.

Having described the novel electrodes of the present invention in general terms, the following detailed description will set forth working embodiments.

Example I

Homgeneous polished metallic foils of palladium, gold, and a series of palladium-gold alloys were prepared and tested in oxygen saturated 1-normal KOH at 40° C. at a constant potential of 0.850 volt versus a hydrogen electrode in the same system. The palladium-gold alloys were made by admixing powders of the two metals in selected proportions and arc-melting the admixture. After cooling, the process is repeated twice to ensure a completely homogeneous alloy. After cooling, the alloy is worked into a thin metallic foil and polished in a manner identical to that used in polishing the pure palladium and pure gold foils. The following data was obtained:

| Alloy composition (atomic percent) | Current density in $\mu a./cm.^2$ at 0.850 v. vs. $H_2/H^+$ in the same system |
|---|---|
| 100% Pd | 800 |
| 98.5% Pd, 2.5% Au | 1010 |
| 94% Pd, 6% Au | 1010 |
| 88% Pd, 12% Au | 1000 |
| 82% Pd, 18% Au | 970 |
| 75% Pd, 25% Au | 910 |
| 70% Pd, 30% Au | 840 |
| 64% Pd, 36% Au | 1300 |
| 60% Pd, 40% Au | 1080 |
| 55% Pd, 45% Au | 1020 |
| 50% Pd, 50% Au | 1030 |
| 45% Pd, 55% Au | 1040 |
| 38% Pd, 62% Au | 990 |
| 32% Pd, 68% Au | 1010 |
| 25% Pd, 75% Au | 1010 |
| 18% Pd, 82% Au | 1000 |
| 88% Au, 12% Pd | 840 |
| 5% Pd, 95% Au | 600 |
| 100% Au | 200 |

As is apparent from the results of the table, the presence of gold in the palladium alloy substantially enhanced the current characteristics. This is surprising in that pure gold has relatively low current characteristics.

Example II

An electrode comprising a 70 mesh nickel support screen, the mesh being on the Tyler scale, and having a thin coating of palladium-gold alloy intermixed with Teflon particles was constructed by coating the screen with a paste of palladium-gold alloy black and Teflon suspended in water. The Teflon, having an average particle size of 0.2 micron in diameter, and the alloy black were present in the suspension at a ratio of 3:10. After coating the screen with the paste, the system was stabilized by heating at 300° C. for 30 minutes. After cooling, the Teflon palladium-gold alloy coating adhered very well to the support screen.

The finely divided alloy black, used above, was prepared by adding an aqueous gold chloride salt solution to a 10% aqueous palladium chloride solution to obtain a palladium to gold ratio of 25:75 on an atomic percent basis. The mixture was introduced slowly into a 3% ammonical solution at room temperature with constant stirring. Upon contact of the two solutions, a finely divided yellow precipitate was formed immediately. Thereafter, an excess of dilute hydrazine was added to reduce the precipitated material to the finely divided metallic state. After washing, testing showed the finely divided metallic particles to be the palladium-gold alloy.

The above-described structure is employed as the cathode in a fuel cell in conjunction with a similarly constructed anode but using platinum black as the activator. The electrolyte of the cell is a 5 normal aqueous potassium hydroxide solution. The operating temperature is 75° C. The anode is fed with gaseous hydrogen at a pressure of 0.15 p.s.i.g. Oxygen is fed to the cathode at a pressure of 0.3 p.s.i.g. Current density versus cell potential data are as follows:

| Current density (Ma./cm.$^2$): | Cell potential (volts) |
|---|---|
| 0.0 | 1.095 |
| 20 | 0.989 |
| 40 | 0.960 |
| 100 | 0.935 |
| 200 | 0.905 |
| 300 | 0.885 |
| 350 | 0.871 |

In the aforesaid example, the palladium-gold alloy black can be prepared by other means. Moreover, while the novel electrode was employed as the cathode, it can be used as the anode with good results in conjunction with known prior art cathodes. Additionally, as is apparent, the atomic percent gold in the palladium-gold alloy can be varied in the range of 1 to 88% in accordance with the invention.

It should be appreciated that this invention is not to be limited to the illustrative examples, as it is possible to produce still other embodiments without departing from the inventive concept herein disclosed and covered by the appended claims.

We claim:

1. An electrochemical cell comprising a fuel electrode, an oxygen electrode, and an electrolyte, said electrochemical cell being constructed and arranged to provide a chamber between said fuel electrode and said oxygen electrode and said chamber retaining said electrolyte, at least one of said electrodes having a catalytic surface which is in direct contact with the electrolyte of the cell over substantially the entire reactive area of the electrode, said catalytic surface comprising a palladium/gold alloy black containing from 35 to 82 atomic percent gold and the remainder being palladium.

2. The electrochemical cell of claim 1 wherein the alloy black is admixed with finely divided polytetrafluoroethylene.

References Cited

UNITED STATES PATENTS 3,372,061  3/1968  Forten _____ 136—86

ALLEN B. CURTIS, Primary Examiner

U.S. Cl. X.R.

75—175; 136—120